United States Patent [19]

Dykzeul

[11] 4,235,323
[45] Nov. 25, 1980

[54] SLIP CLUTCH ASSEMBLY

[75] Inventor: Theodore J. Dykzeul, Rolling Hills, Calif.

[73] Assignee: Robertshaw Controls Company, Richmond, Va.

[21] Appl. No.: 914,071

[22] Filed: Jun. 9, 1978

[51] Int. Cl.² .............................................. B60L 5/00
[52] U.S. Cl. ....................................... 192/95; 236/94; 337/347; 403/248
[58] Field of Search ........................... 192/95; 236/94; 337/347, 374; 403/248, 259, 261

[56] References Cited

U.S. PATENT DOCUMENTS

| | | | |
|---|---|---|---|
| 553,099 | 1/1896 | Brown | 403/248 X |
| 2,953,937 | 9/1960 | Jackson et al. | 236/21 X |
| 2,994,755 | 8/1961 | Hildenbrandt et al. | 236/94 X |
| 3,190,988 | 6/1965 | Graham et al. | 236/68 B X |
| 3,367,687 | 2/1968 | Jenkins | 403/261 |
| 3,683,304 | 8/1972 | Freeby | 236/94 X |
| 3,794,312 | 2/1974 | Freeby | 267/156 |

Primary Examiner—James C. Mitchell
Attorney, Agent, or Firm—Fulwider, Patton, Rieber, Lee & Utecht

[57] ABSTRACT

There is disclosed a slip clutch useful for the fixed adjustability of an indexed knob on a control shaft of a device such as thermostatically controlled gas valve for a water heater. The clutch comprises the assembly of a shaft with a reduced end portion to provide an annular distal shoulder, a ring received over the end and having a radial tab, a spring washer also received over the end of the shaft and resiliently biasing the ring against the annular shoulder and an outwardly flared end of the shaft to secure the assembly. The end of the shaft is hollow form and has internal wrench flats so that the shaft can be immobilized and the ring rotated about the shaft. The control knob is received over the ring and has a radial slot which receives the radial tab.

6 Claims, 3 Drawing Figures

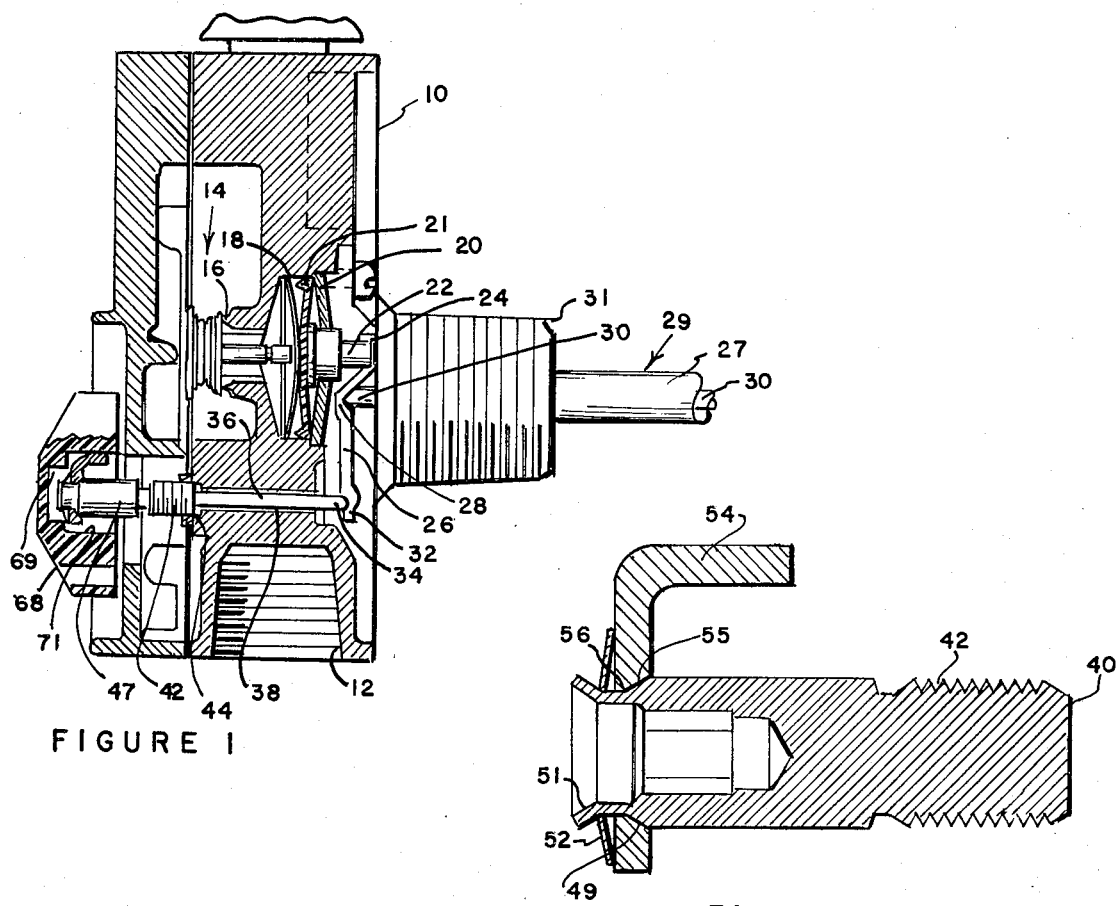

SLIP CLUTCH ASSEMBLY

BACKGROUND OF THE INVENTION

Thermostatic devices such as the thermostatically controlled gas valves for water heaters and the like must be calibrated for the desired response to predetermined temperatures. Usually, the calibration is performed at the factory although it may also be done after installation of the thermostatic device.

The typical thermostatically controlled gas valve for water heaters employs a rod and tube thermostat which is immersed in the water within the water tank. The thermostat is supported from the gas valve assembly which receives the operating rod of the thermostat abutted against a lever that is mounted in the valve assembly to transmit movement from the thermostat rod to a snap-acting valve actuation mechanism. The fulcrum end of the lever within the valve structure is mounted on a temperature adjustment screw. This temperature adjustment screw has a control shaft projecting exteriorly of the gas valve and receives an indexed control knob that registers with a water temperature dial so that rotation of the control knob advances or retracts the adjustment screw and changes the position of the fulcrum for the operating lever.

After assembly of the water heater thermostat, it is necessary to calibrate the response of the device to the temperatures indicated by the index marker on the control knob. This calibration requirement has been the subject of a prior patent, U.S. Pat. No. 3,794,312, which discloses a sleeve clamp which is mounted over the control shaft and which resiliently grips the control shaft when the control knob is mounted on the shaft. While this structure is a considerable improvement over prior devices, it is desirable to provide a simpler assembly having reduced manufacturing costs and a longer service life.

BRIEF DESCRIPTION OF THE INVENTION

The present invention comprises a slip clutch assembly to provide fixed adjustability in the annular position of a member such as a control knob on a control shaft. The structure of this invention comprises providing an annular shoulder on the end of the control shaft which receives a ring member. The ring member has a radial tab which coacts with a radial slot in the control knob, thereby securing the knob and ring together in a fixed annular orientation when the control knob is placed over the control shaft. A spring washer is received on the shaft and secured thereto by a retainer on the end of the shaft so that washer resiliently biases the ring member against the annular shoulder. This resilient biasing of the ring against the annular shoulder provides a controlled frictional drag between the shaft and ring member. The assembly, however, permits for the forced movement of the ring relative to the shaft whereby the angular position of the ring, and hence the control knob, on the shaft can be fixedly adjusted.

BRIEF DESCRIPTION OF THE DRAWINGS

FIG. 1 is a side elevation, partially in section, of a valve assembly employing the slip clutch assembly of the present invention;

FIG. 2 is a sectional view of the calibration assembly of FIG. 1; and

FIG. 3 is an exploded, perspective view of the calibration assembly of the invention.

DESCRIPTION OF PREFERRED EMBODIMENTS

The slip clutch of the invention is illustrated in FIG. 1 for use with a water heater thermostat. Water heater thermostats are well known in the art and normally include a casing 10 having an inlet port, not shown, communicating with an outlet port 12 under the control valve 14 adapted to cooperate with a valve seat 16 within the casing. The inlet port is adapted to receive fuel from a gas source, not shown, and outlet port 12 receives a conduit for supplying fuel to a main burner, also not shown. The valve member 14 is controlled by a conventional snap actuator mechanism 18 including a snapover disc which moves from an inoperative to operative position through an overcenter position with a snap action in response to an applied operating force. The actuating mechanism 18 is retained in an exterior recess formed in the rear wall of casing 10 by a washer 20 which is press fitted into the exterior recess along with a diaphragm seal 21. The operating force is applied to the actuating mechanism 18 by an operating button 22 extending through an opening in washer 20.

Operating button 22 abuts an operating end 24 of lever 26 having an intermediate recess 28 which receives the inboard end of a rod 30 of a rod and tube temperature sensing assembly 29 that is supported on casing 10 by a shank member 31. A recess is provided at the fulcrum end 32 of lever 26 to receive an end 34 of an extension rod 36 which is disposed within a cylindrical guide 38 in casing 10. The rod and tube temperature sensing assembly 29 is a conventional assembly of a copper outer tube 27 that expands and contracts with increasing and decreasing temperatures and rod 30 is made of a material having low coefficient of thermal expansion, such as INVAR, such that rod 30 moves operating end 24 of lever 26 away from operating button 22 with increasing temperatures and toward button 22 with decreasing temperatures. Lever 26 is part of the temperature sensing assembly and is positioned to permit accurate operation of the thermostat at predetermined set temperatures.

The longitudinal displacement of rod 36 within cylindrical guide 38 is achieved by advancement or retraction of the threaded shank 42 of the control shaft 47 of the assembly. The threaded shank 42 is received within the internally threaded bore 44 of casing 10. The control shaft 47 is located by temperature adjusting knob 68 in a manner described in greater detail hereinafter.

Referring now to FIG. 2, the slip clutch assembly of the invention will be described in greater detail. As there shown, the control shaft 47 has an end 40 having a threaded shank 42 which is received within an internally threaded bore of casing 10. As apparent from FIG. 1, the shaft 47 is received in casing 10 coaxial with rod 36 such that the end 40 of control shaft 47 butts against the end of rod 36.

The opposite end of control shaft 47 has a small diameter end portion 48 with a tapered, annular shoulder 49 between the main shaft and reduced diameter portion 48. The end of shaft 47 is of hollow form construction with a central bore 62 which has internal wrench flats 50 suitable for receiving a wrench such as an Allen wrench and the like.

The reduced diameter end portion 48 receives ring 54 which has a central aperture 56 that permits it to be fitted over the end portion 48. Preferably, the inside face of ring 54 has an annular bevel 55 (See FIG. 3) about aperture 56 to provide smooth contact with annular shoulder 49 and the engagement of these surfaces provides the clutch surface of the assembly. Ring 54 has a radial tab 58 and is bent to provide a longitudinally extending tip portion 60.

The other member of the slip clutch assembly comprises a spring washer 52 which is a truncated conical washer such as a Bellville washer and the like having an aperture 53 to permit the washer 52 to be received over the small diameter end portion 48.

Referring now to FIG. 3, the assembly of the ring, spring washer and control shaft is secured by the outwardly flaring of the wall of the hollow form small diameter end portion 48. This assembly is simple and accurate by the application of a controlled air pressure to a pneumatic punch, typically set for about 50 psig which results in the outward flaring at 51 of the wall of end portion 48, thereby securing the assembly. This assembly applies the resilient bias of spring washer 52 against ring 54 and forcibly engages ring 54 to the annular shoulder 49 of control shaft 47. In a typical assembly, the resiliency of the spring is sufficient to require approximately 40 inch-ounces torque to rotate the ring 54 and change its annular orientation on control shaft 47.

Referring again to FIG. 1, the temperature adjusting knob 68 is shown with a hollow center 69 to accomodate the slip clutch assembly and has a radial groove 71 to snugly receive the radial tab 58, thereby interlocking the angular positions of control knob 68 and ring 54. An index mark is scribed on the outer surface of control knob 68 and this cooperates with indicia, not shown, on the front face of the casing 10 adjacent knob 68 to indicate sensed water temperature.

In operation, the thermostat is mounted on a water heater tank with the shank 31 received in an internally threaded nozzle of the water tank and with the dependent rod and tube thermostat projecting into the water contained within the tank. The response of the valve assembly 14 is controlled by the initial positioning of the adjustment threaded shank 42 of shaft 47. When the water temperature within the tank drops below a predetermined temperature, end 24 of lever 26 will be moved towards the control device moveable therein. These rod and tube assemblies conventionally include a copper and Invar mechanism 29 and snapover valve means 14 to supply fuel to the burner to increase the water temperature. Once the water obtains the predetermined temperature, lever 26 is moved sufficiently by withdrawal of rod 30 into the tube to permit valve means 14 to close and stop the flow of fuel to the burner.

The calibration of the thermostat is accomplished by placing the assembly in a tank of water of predetermined temperatures. Knob 68 is rotated to correspond to the tank water temperature and removed without disturbing the position of ring 54. The ring 54 is held stationary by the operator and an Allen wrench is inserted in bore 62 of control shaft 47 to engage the wrench flats 50 therein. The adjustment screw 40 is then rotated clockwise with the Allen wrench until the fulcrum end 32 of lever 26 is positioned so that the actuating mechanism 18 opens the valve member 14. The adjustment screw 40 is then rotated counterclockwise while restraining ring 54 from movement until the valve member 14 closes. During this setting, ring 54 is held stationary. The knob 68 is then inserted over the end of the control shaft 47 and lateral tab 58 to frictionally engage the control shaft and tab 58, thereby interconnecting the control knob and control shaft 47.

The slip clutch thus described is highly advantageous in that it is quite simple to manufacture and assemble, being formed only of three component elements, i.e., control shaft 47, ring 54 and spring washer 52. Additionally, the assembly is simple and direct since it only requires the positioning of the ring 54 and spring washer 52 over the small diameter end portion 48 of control shaft 47 and thereafter upsetting or outwardly flaring the end wall portion 48 with a punch that applies a force of predetermined magnitude. This results in the outward flare 51 in the end portion 48 which secures the assembly. The application of a predetermined force by a pneumatic punch can be closely controlled to provide a slip clutch having a fairly precise, predetermined torque required for rotation of the ring 54 on the shaft 47. The slip clutch can also be set and reset in a repetitive fashion without loosening since the movement of the ring 54 does not exert a force or produce any appreciable wear on the outwardly flared portion 51.

The invention has been described with reference to the presently preferred and illustrated embodiment. It is not intended that the invention be unduly limited by this description of the preferred embodiment. Instead, it is intended that the invention be defined by the means, and their obvious equivalents, set forth in the following claims:

What is claimed is:

1. A slip clutch for fixed angular adjustability of a member on a shaft which comprises the assembly of:
    (a) a shaft bearing external threads on one end and having a short reduced diameter portion at its opposite end;
    (b) a bevelled annular shoulder positioned between said reduced diameter portion and the full diameter portion of said shaft;
    (c) a ring member received over the end of said shaft, and having a radial tab;
    (d) a spring washer also received over the end of said shaft and resiliently biasing said ring member against said bevelled annular shoulder;
    (e) an outwardly flared annular wall at said opposite end of said shaft securing said assembly against axial displacement and biasing said spring washer against said ring member; and
    (f) a knob member received over said shaft and having a radial groove to receive said tab.

2. The clutch of claim 1 wherein said knob member has index means.

3. The clutch of claim 1 wherein said opposite end of said shaft is of hollow form construction.

4. The clutch of claim 3 including interior wrench flats on said opposite end of said shaft.

5. The clutch of claim 1 wherein said radial tab has a bent axially aligned tip.

6. The clutch of claim 2 wherein said shaft is received in a threaded receptacle and said slip clutch provides for fixed adjustability between the annular orientation of said index means and the axial position of said shaft in said threaded receptacle.

* * * * *